(No Model.)
A. ROBINSON & C. S. RICKARD.
UMBRELLA DRIP CATCHER.
No. 390,255. Patented Oct. 2, 1888.
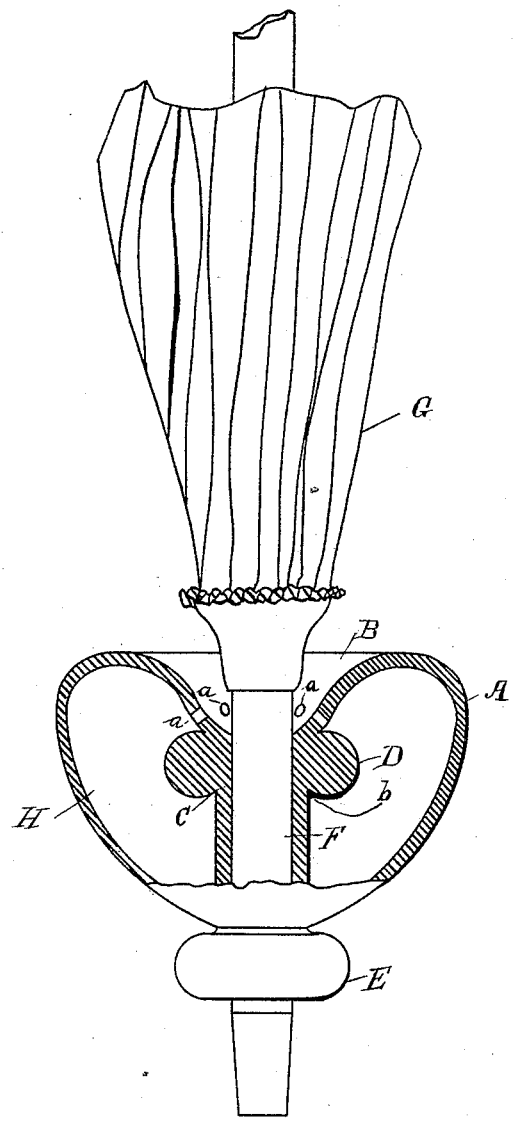
Witnesses
Harold S. MacKaye
Maurice Cooney
Albert Robinson and
Charles S. Rickard
Inventors
By their Attorney
Chas. E. Barber.

UNITED STATES PATENT OFFICE.

ALBERT ROBINSON AND CHARLES S. RICKARD, OF GRAND RAPIDS, MICHIGAN.

UMBRELLA DRIP-CATCHER.

SPECIFICATION forming part of Letters Patent No. 390,255, dated October 2, 1888.

Application filed August 12, 1885. Serial No. 174,224. (No model.)

*To all whom it may concern:*

Be it known that we, ALBERT ROBINSON and CHARLES S. RICKARD, citizens of the United States, residing at the city of Grand Rapids, in the county of Kent and State of Michigan, have invented a new and useful Improvement in an Umbrella Drip-Catcher, of which the following is a specification.

Our invention relates to that class of umbrella drip-catchers made from any suitable material and so adjusted to the end of the stock or handle that it may catch and retain the drip, thereby preventing the drippings from a wet umbrella running on the floor or carpet. We attain these objects by the mechanism illustrated in the accompanying drawing.

A designates a continuous elastic bulb, made preferably of rubber, and provided with a depressed or dished upper portion, B, provided with perforations *a a*, and ending in a collar, C, which may extend entirely through the bulb from end to end, or only as far as the line *b*, as may be desired. The collar C may be provided with an additional inner strengthening-ring, D, which will give additional strength and rigidity to the drip-catcher. The lower outer portion of the bulb A is provided with a ring, E, which forms a collar that encircles the stick F of the umbrella near its outer end.

The device is adapted to be slipped over the end of the umbrella-stick, as shown in the drawing, and it may be held against accidentally straightening out on the stick by the ring D embracing the collar C when the latter does not extend entirely through the bulb; or the ring may be dispensed with and the collar extended entirely through the bulb from end to end, which will secure the same result.

When the umbrella and holder are placed in a vertical position, as shown in the drawing, any water which may be held within or by the fabric G will flow down into the cup-shaped depression B, and thence through the perforations *a* into the interior chamber, H, of the bulb or drip-catcher A.

What we desire to secure by Letters Patent, and what we therefore claim, is—

1. The drip-cup for umbrellas herein described, consisting of a continuous bulb having a perforated dished or depressed upper portion provided with an inner ring and a collar which embraces the umbrella-stick, said bulb also provided at its lower extremity with an outer ring, and the whole made in one piece and of elastic material, substantially as and for the purposes specified.

2. The drip cup for umbrellas herein described, consisting of a continuous bulb having a perforated dished or depressed upper portion, said bulb also provided at its lower extremity with an outer ring, and a continuous central collar extending entirely through the bulb from end to end, and the whole made in one piece and of elastic material, substantially as and for the purposes specified.

ALBERT ROBINSON.
C. S. RICKARD.

Witnesses:
O. D. FISHER,
W. G. HAWKINS.